(12) United States Patent
Belfiore et al.

(10) Patent No.: US 6,175,863 B1
(45) Date of Patent: Jan. 16, 2001

(54) STORAGE OF SITEMAPS AT SERVER SITES FOR HOLDING INFORMATION REGARDING CONTENT

(75) Inventors: Joseph D. Belfiore, Redmond; Ian M. Ellison-Taylor, Seattle; Sankaranarayanan Ramasubramanian, Redmond; Chee H. Chew, Redmond; Scott E. Berkun, Redmond, all of WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/105,636

(22) Filed: Jun. 26, 1998

Related U.S. Application Data

(62) Division of application No. 08/683,663, filed on Jul. 17, 1996.

(51) Int. Cl.[7] .................................................. G06F 15/163
(52) U.S. Cl. ........................ 709/218; 709/203; 709/217; 345/335; 345/356; 345/357; 707/102
(58) Field of Search .................................... 709/203, 218, 709/217; 345/335, 356, 357; 707/102, 514

(56) References Cited

U.S. PATENT DOCUMENTS

| | | | |
|---|---|---|---|
| 5,572,643 | * | 11/1996 | Judson .................................. 709/218 |
| 5,625,781 | * | 4/1997 | Clince et al. ......................... 345/335 |
| 5,644,740 | * | 7/1997 | Kiuchi ................................... 345/357 |
| 5,802,299 | * | 9/1998 | Logan et al. ......................... 709/218 |
| 5,937,163 | * | 8/1999 | Lee et al. .............................. 709/218 |
| 6,035,330 | * | 3/2000 | Astiz et al. ........................... 709/218 |

OTHER PUBLICATIONS

Keith Andrews et al., "The Hyper–G Network Information System," *Journal for Universal Computer Science*, vol.1, No. 4, Apr. 1995, IICM, Graz, Austria, pp. 205–220.

Keith Andrews et al., "On Second Generation Hypermedia Systems," *Journal for Universal Computer Science*, vol. 0, 1994, IICM, Graz, Austria, pp. 127–135.

Udo Flohr, "Hyper–G Organizes the Web," *Byte*, Nov. 1995, 11 pages.

Adrian King, "Inside Windows™ 95", Microsoft Press, Redmond, Washington, 1994, pp. 157–221.

Andrew Pam et al., "A Comparison of WWW and Hyper–G", *Journal for Universal Computer Science*, vol. 1, No. 11, Nov. 1995, IICM, Graz, Austria, pp. 743–750.

Denise Shelton, "ForeFront Releases WebWhacker 1.0", Microsoft Visual Basic 5.0, 1996, 1 page.

Web pages from NetCarta Web Site, 1996, 4 pages.

* cited by examiner

*Primary Examiner*—William M. Treat
(74) *Attorney, Agent, or Firm*—Christensen, O'Connor Johnson Kindness PLLC

(57) ABSTRACT

Sitemaps are utilized to hold content-related information about hypertext documents stored at a server site. The hypertext documents may be web pages for the World Wide Web portion of the Internet. Each sitemap file may hold a hierarchical index of the web pages that are accessible at the server site. Each sitemap may also hold search results that identify web pages that comply with the search criteria and/or ratings information regarding the content of the web pages at the server site. The sitemaps may also be utilized by web crawler programs to build an index of web pages available at the server site. The sitemap files may be located at a default location of the server site or, alternatively, may be located at a site designated by information held in a specified hypertext document at the server site.

5 Claims, 13 Drawing Sheets

STORAGE OF SITEMAPS AT SERVER SITES FOR HOLDING INFORMATION REGARDING CONTENT

This application is a divisional of prior application Ser. No. 08/683,663, filed Jul. 17, 1996.

TECHNICAL FIELD

The present invention relates generally to computer systems and, more particularly, to the storage of sitemap files at server sites for storing content information.

BACKGROUND OF THE INVENTION

It is currently difficult for a user to easily discern what web pages are available at a web site in the World Wide Web (WWW) portion of the Internet. Typically, a user must access each of the pages at a web site in order to determine what pages are available. Moreover, the indexing information, if any, that is maintained at a web site is typically a one-level index that lists the pages that are available for access from a current page at a next level in a hierarchy of pages. In addition, the indexing information is typically only available at the web site and is not available for downloading to the user's computer. A related difficulty is that search results for searches that are conducted at web sites typically cannot be integrated into the client's narnespace. Moreover, the client is often unaware of the content of a web page until the client visits the web page. Hence, a client may stumble upon offensive material or material that is not suitable for young users.

SUMMARY OF THE INVENTION

In accordance with the present invention, a data block is provided on a server that holds information regarding content of hypertext documents, such as web pages, that are stored on a server computer. The data block may hold index information about the hypertext documents or, alternatively, may hold search results that identify which of the hypertext documents meet search criteria. Still further, the data block may hold ratings information regarding ratings of the content of the hypertext documents. The data block is downloaded from the server computer to the client computer and information is extracted from the data block. The information then may be persistently stored at the client computer. The server may be an Internet server or an Intranet server.

The data block or file that holds information regarding the contents of the hypertext documents may be located at a default location on the server or at a location specified by fields within the hypertext documents on the server. The default location may be determined by appending a predefined string to a uniform resource locator (URL) for the server. For example, the string "sitemap.SMP" may be appended to the URL to identify the default location of the file. Alternatively, a hypertext document, such as a home web page, at the server may hold a field that specifies the location of the file.

The content extracted from the data block may be output on output devices at the client computer. For example, visual representations of the hypertext documents may be displayed on an output device at the client computer. Similarly, audio representations of the hypertext documents may also be output at the client computer. In one embodiment, representations of the hypertext documents are displayed in a first pane of a multi-paned window and contents of one of the hypertext documents are displayed in a second pane of the multi-paned window. In an alternative embodiment, a user interface element, such as a pop-up window, is displayed on top of a window that holds the contents of one of the hypertext documents. This user interface element holds visual representations of at least some of the hypertext documents. A user may be able to access one of the hypertext documents through such visual representations. For example, a user may be able to double click on one of the visual representations in order to invoke a web browser that displays the contents of the associated hypertext document.

BRIEF DESCRIPTION OF THE DRAWINGS

A preferred embodiment of the present invention will be described below relative to the following drawings.

DETAILED DESCRIPTION OF THE INVENTION

The preferred embodiment of the present invention provides an approach to indexing the contents of web pages at a web site. The indexing information may be downloaded from a collection of one or more web sites and integrated into the shell namespace at a client computer. As a result, a client may procure an index to web pages at a web site, and the web pages may be accessed from the shell namespace. The preferred embodiment of the present invention also provides a vehicle for integrating search results that are the product of a search at one or more web sites into the shell namespace and for providing a convenient mechanism for obtaining ratings information regarding web pages that indicate whether the web pages are suitable for younger viewers or may contain offensive content.

The preferred embodiment of the present invention stores sitemap files at servers that hold web pages. The sitemap files may hold a number of different things, including a hierarchical list of web pages that are available at the server site. The sitemap files may also hold search results that are the product of a search or may hold ratings information. The sitemap files are each asynchronously and transparently downloaded when a web site is visited by a client. Sitemap files are designated in the preferred embodiment of the present invention by the filename extension ".SMP." It should be appreciated that a single server may hold multiple sitemap files. Moreover, the sitemaps need riot be stored in separate files but may be stored in streams or integrated with other data.

The preferred embodiment of the present invention will be described relative to an implementation for the World Wide Web portion of the Internet. Nevertheless, those skilled in the art will appreciate that the present invention may also be practiced in other types of distributed environments, including intranets. The present invention may also be used with hypertext documents other than web pages. Furthermore, the present invention may be practiced in instances where the sitemap file holds other content-related information that differs from the examples described below.

Figure 1:
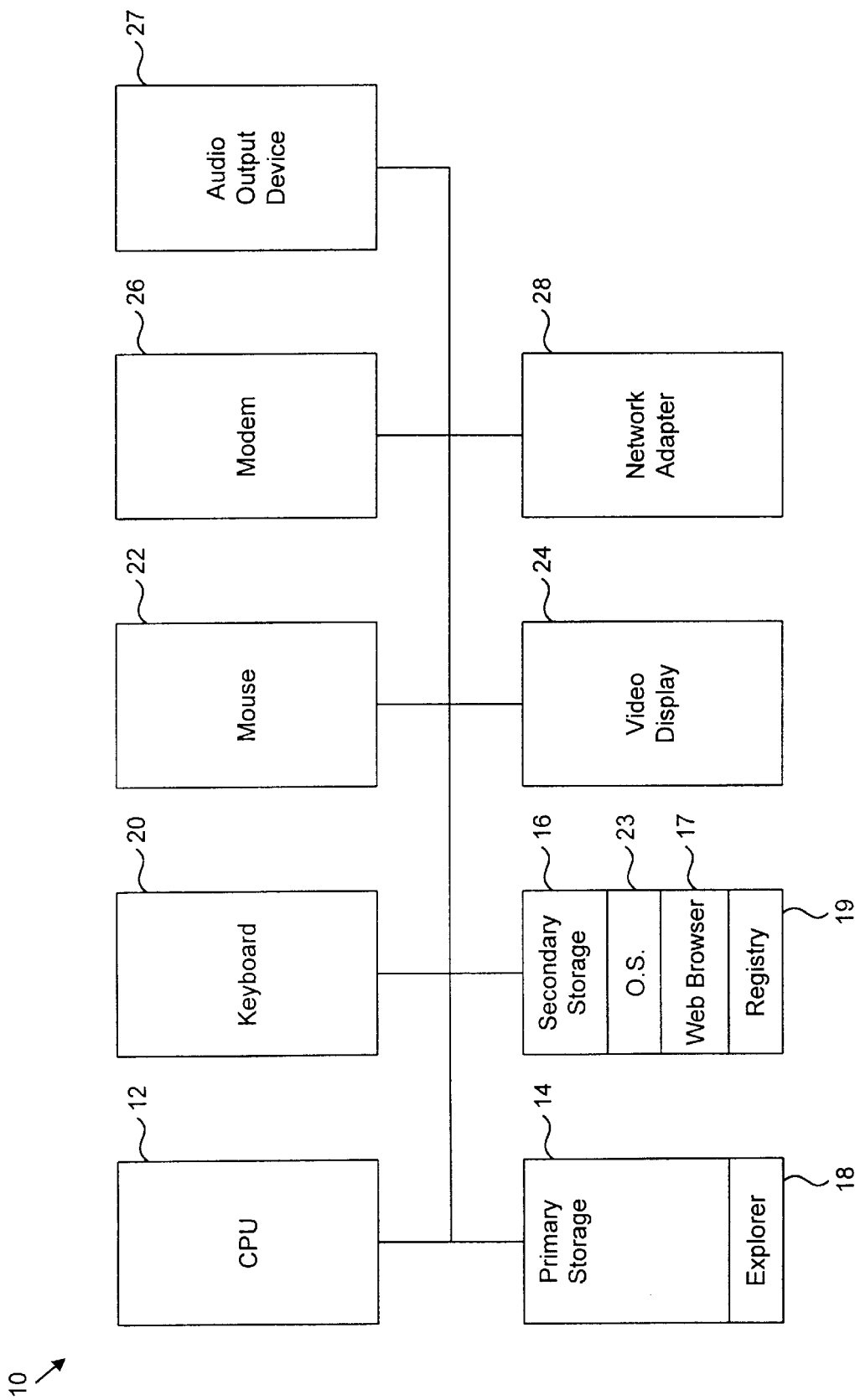
FIG. 1 is a block diagram of a client computer that is suitable for practicing the preferred embodiment of the present invention.

FIG. 1 is a block diagram of a client computer 10 that may communicate with a server computer 30 to practice the preferred embodiment of the present invention. For purposes of the discussion below, the client computer 10 is the computer that seeks access to the web pages that are available via the server computer 30. The client computer 10 includes a central processing unit (CPU) 12, such as a microprocessor, that oversees the operations of the client computer. The client computer 10 also includes a primary storage 14 made up of memory devices, such as random access memory (RAM) devices, and a secondary storage 16, such as an optical disk drive or hard disk drive. For purposes of the discussion below, it is assumed that an explorer program 18 is stored within the primary storage 14. The explorer program 18 is a navigation program that provides a mechanism for the user to explore the shell namespace, and in the present invention, shortcuts to pages on the WWW that are integrated into the shell namespace. Those skilled in the art will appreciate that the present invention does not require the use of the explorer 18 and may be practiced in instances wherein the explorer of the shell namespace is integrated with a web browser.

The secondary storage 16 holds a copy of an operating system (O.S.) 23. A suitable operating system is the Microsoft® Windows® 95 Operating System, sold by Microsoft Corporation of Redmond, Washington. The explorer 18 may be provided as part of the operating system 23 and is shown as a separate entity in FIG. 1 for illustrative purposes only. A web browser 17 is provided to gain access to and navigate the WWW of the Internet. The secondary storage 16 also holds a copy of a registry 19 that maintains configuration information about the system. The registry 19 may be integrated into the operating system 23, although the registry is shown as being separate in FIG. 1. The client computer may also include a number of peripheral devices, including a keyboard 20, a mouse 22, a video display 24 and an audio output device 27 such as a loudspeaker. The client computer 30 may additionally include a modem 26 for communicating with remote devices and a network adapter 28 for interfacing the client computer with a network connection for a local area network (LAN) of a wide area network (WAN).

Figure 2:
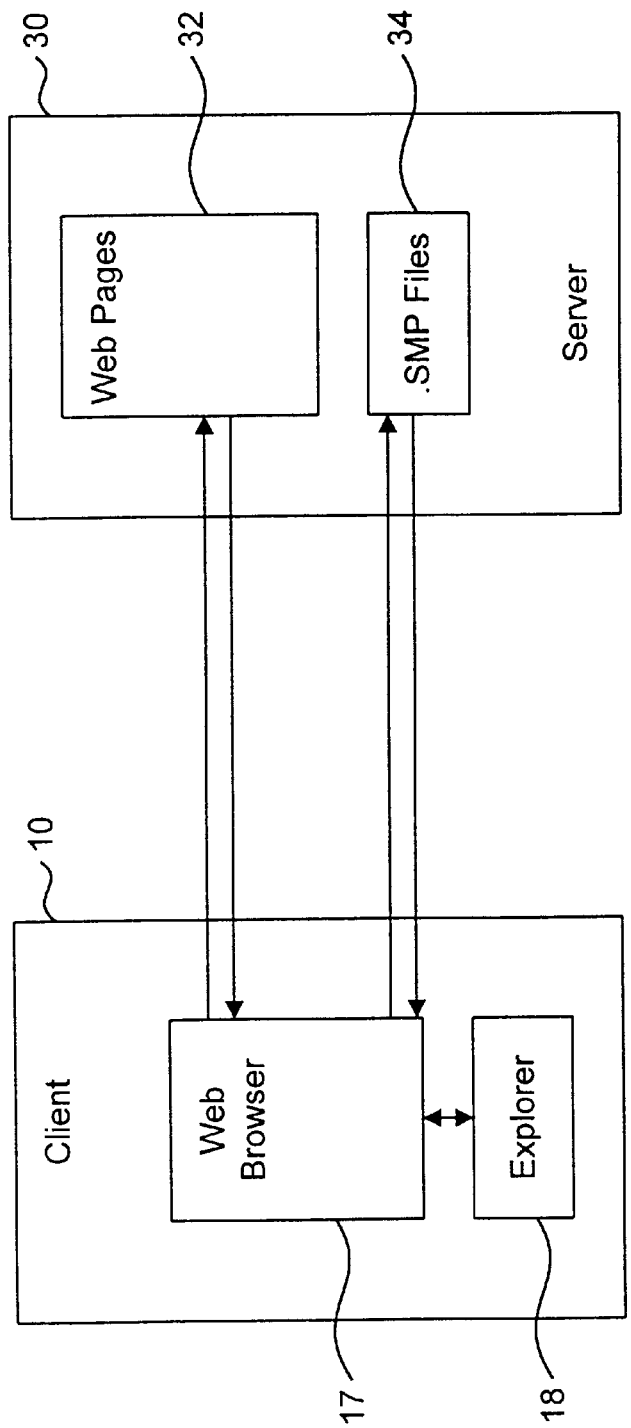
FIG. 2 is a block diagram illustrating interaction between a client computer and a server computer in the preferred embodiment of the present invention.

FIG. 2 is a block diagram that illustrates the interaction between the client computer 10 and the server computer 30 in the preferred embodiment of the present invention. The client computer 10 includes the web browser 17 that employs software for browsing web sites on the WWW. The web browser 17 is capable of parsing and interpreting hypertext documents in the hypertext markup language (HTML). The server computer 30 includes one or more web pages 32 that are documents in the HTML format. In addition, the server computer 30 includes one or more sitemap files 34, each with a filename that includes the .SMP extension. For purposes of the discussion below, it is assumed that a single sitemap file is at the server 30. Nevertheless, it should be appreciated that multiple sitemap files may be resident at a single server.

Figure 3:
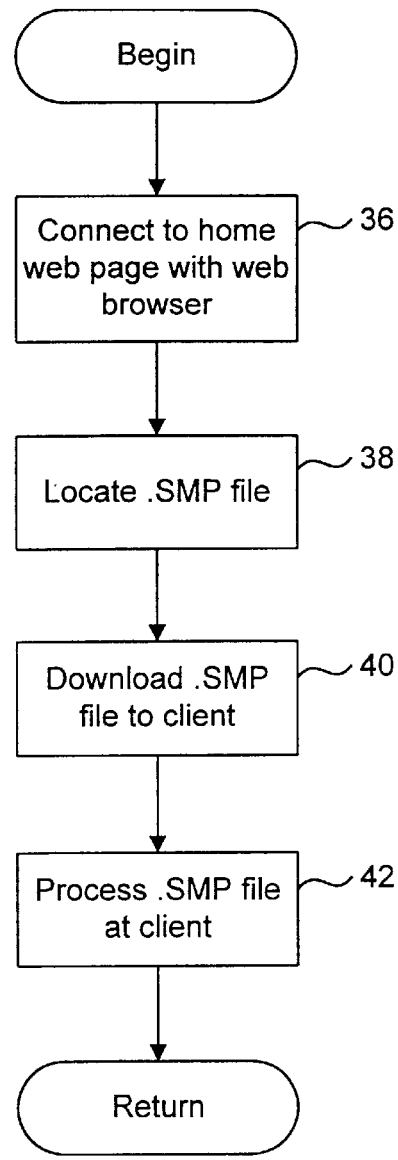
FIG. 3 is a flowchart illustrating the steps that are performed to utilize a sitemap file in the preferred embodiment of the present invention.

The sitemap file is used when the client computer 10 connects with the server computer 30. FIG. 3 is flowchart that illustrates the steps that are performed when such a connection is realized. As shown in FIG. 3, initially, the web browser code and the explorer 18 at the client computer 10 creates a connection with the server computer 30 to gain access to a home web page 32 or other designated web page (step 36 in FIG. 3). The explorer 18 locates the sitemap file 34 (step 38 in FIG. 3). The details of locating a sitemap file will be described in more detail below. The sitemap file 34 is then downloaded from the server computer 30 to the client computer 10 (step 40 in FIG. 3). The sitemap file 34 is processed at the client computer 10 to utilize its contents (step 42 in FIG. 3). The discussion below will consider examples where the sitemap file holds a hierarchical index of contents of the web site, ratings information and/or search results.

It should be appreciated that the present invention envisions alternative embodiments relative to when the sitemap is accessed. In a first embodiment, the sitemap file is accessed each time that the client computer 10 connects with the server computer 30. In a second embodiment, the sitemap is not always accessed. The information previously extracted from a sitemap is preserved at the client computer 30 even after client computer 10 has completed accessing the server computer 30. In this embodiment, the contents that are extracted from the sitemap are persistently stored at the client computer 10. A number of different options may be provided for removing such content. For example, content may be aged out based upon when the content was last accessed. Similarly, a fixed amount of content may be preserved at the client computer 10 and preserved on a most frequently used or most recently used basis.

As was discussed above, the web browser 17 must be able to locate the sitemap. The web browser first looks for a sitemap at a default location and then, if the sitemap is not at the default location, the web browser examines the home web page document at the server computer 30 to determine whether the home web page holds information regarding the sitemap. The web browser uses a uniform resource location (URL) to identify the web site at the server computer 30. The web browser 17 appends the string "sitemap.SMP" to the URL of the web site at the server computer 30 (step 44 in FIG. 4). The filename "sitemap.SMP" is the default name for a sitemap file and appending this default name to the URL of the web site causes the browser to look for the default name at the web site. The web browser 17 then attempts to download the file at the modified URL that has "sitemap.URL" appended to it (step 46 in FIG. 4). If the attempt to download the file is successful (see step 48 in FIG. 4), the file has been located. In contrast, if the attempt to download the file is unsuccessful (see step 48), the web browser 17 accesses a home web page at the specified web site to determine whether it includes information regarding a sitemap file 34. The home web page document 32 is in an HTML format that utilizes tags that delimit elements. An <object> tag is provided to delimit information regarding the sitemap file. Thus, when the explorer 18 is parsing the HTML document, it looks for the <object> tag (step 50). In the preferred embodiment of the present invention, the <object> tag delimits an id for the object, a classed that specifies an object class identifier and a data field that specifies a URL for the sitemap file. An example of an <object> tag is as follows:

```
<OBJECT CLASSID= "clsid:438C0EA0-5731-11CF-9AF8-
0020AF73AD51">
    <param name="Name" value="SiteMap1">
    <param name="URL" value="http://www.microsoft.com">
</OBJECT>
```

Figure 4:
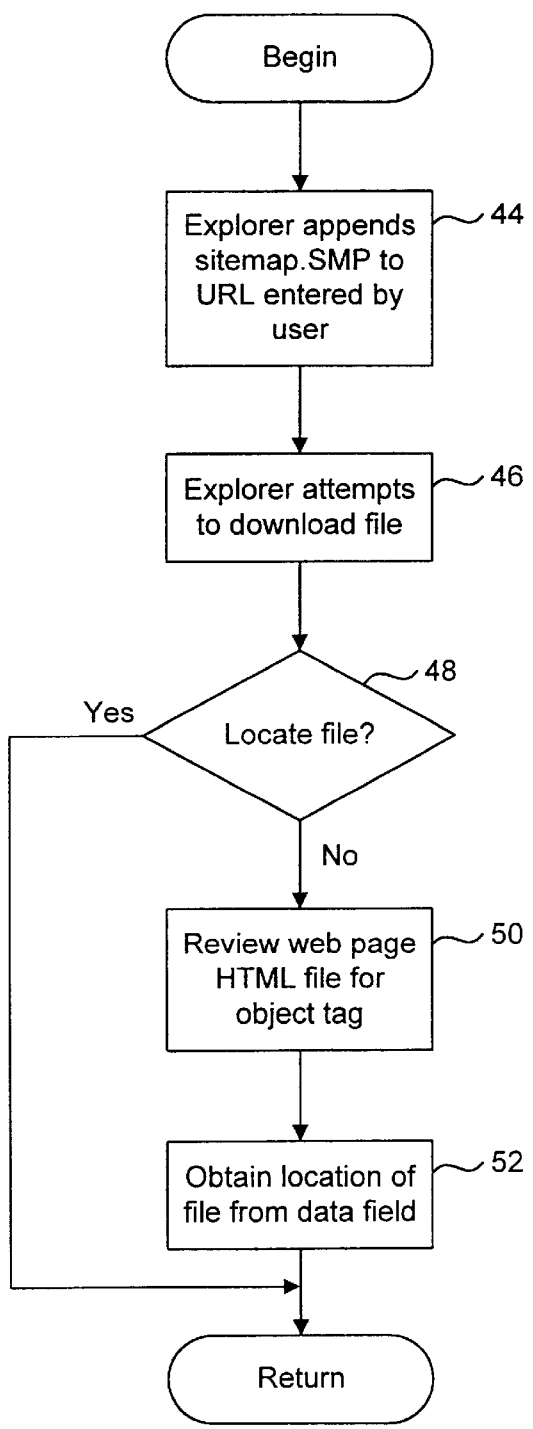
FIG. 4 is a flowchart illustrating the steps that are performed to locate a sitemap file at a server.

The URL field is extracted and utilized to obtain the location of the sitemap file (step 52 in FIG. 4).

Although the above discussion included instances where a default sitemap file was located or, alternatively, the object tag specified where the sitemap file was located, those skilled in the art will appreciate that, in alternative embodiments, the present invention may be practiced solely with default sitemap files or solely with sitemap files that are identified within the object tag. Furthermore, the <object> tag may be located in an HTML file other than the home page. In addition, the order in which the techniques of locating the sitemap file are performed may be reversed so that the HTML file is first searched and then the default location is used.

When the sitemap file 34 is downloaded to the client computer 10, the client computer 10 must create data structures to hold the data that is loaded from the sitemap file 34. In order to appreciate what information is downloaded, it is helpful to review the format of the sitemap file adopted by the preferred embodiment of the present invention. The format of the sitemap file is a hybrid of the HTML format. An example of the sitemap file 34 is as follows:

```
[ Sitemap 1.0]
[! Sitemap for http://www.microsoft.com]
<LI> <OBJECT CLASSID = "clsid:A61D5780-BA29-11
CF-952E-00C04FD705B4">
    <param name="Name" value="Microsoft's Main Web Page">
    <param name="URL" value="http://www.microsoft.com">
    <param name="Icon" value="system:moreicons.dll#1">
    <A HREF="http://www.microsoft.com"> Microsoft's web page
    </A>
</OBJECT>
<UL>
    <LI> < OBJECT CLASSID = "clsid:A61D5780-BA29-
    11CF-952E-00C04FD705B4">
        <param name="Name" value="Microsoft's Products
        Web Page">
    <param name ="URL" value="http://www.microsoft.com/
    products">
    <param name="Icon" value=
    "system:moreicons.dll#1">
    <A HREF="http://www.microsoft.com/
    products.htm"> Microsoft Products
    </A>
        </OBJECT >
        <UL>
        <LI> <OBJECT CLASSID = "clsid:A61D5780-BA29-
        11CF-952E-00C04FD705B4">
```

-continued

```
            <param name="Name" value=
            "Microsoft's Windows 95">
        <param name ="URL" value="http://www.microsoft.com/
        products/win95">
        <param name="Icon" value="system:moreicons.dll#1">
            <A HREF="http://www.microsoft.com/products.htm/
            win95" > Microsoft
    Windows 95
        </A>
    </OBJECT>
<UL>
<LI>
```

As can be seen from the above example, list item tags (i.e., <LI>) are utilized to designate list items. Each list item corresponds with a web page, and each 40 list item includes a name field as well as a URL that identifies the location of the web page at the web site. Each item also includes a designation of an icon for representing the web page. The icon may be specified in a number of different ways. In a first case, a numeral code for the icon may be specified to identify the icon as one of a number of predefined icons. In a second instance, the icon is specified by identifying a DLL that provides the icon. Examples of such instances are given in the illustrated sitemap file that is set forth above. A third alternative is for the value of the icon parameter to specify a URL that identifies a remote site where the icon is held. This URL is used to download the icon.

Hierarchies of lists are designated by using the unordered list tags (<UL>, </UL>). For instance, in the above-described example, the unordered list tags are used to delineate items (i.e., web pages) that are hierarchically indexed at a level below the Microsoft's Main Web Page. The next level web pages in the explorer 18 include the Microsoft's Products Web Page.

The sitemap file 34 also includes object tags that hold contents that consist of pairs of parameter values. These parameter values may specify the name of a file or a URL. Alternatively, these parameters may specify an icon number or a size of a file in bytes. Still further, the parameters may specify a Boolean attribute that indicates whether or not the items should be shown in the sitemap by a display control. The parameters may also include a preload parameter that specifies the probability or priority of preloading. Furthermore, the parameters may specify a <A HREF> which is a standard link reference.

Figure 5:
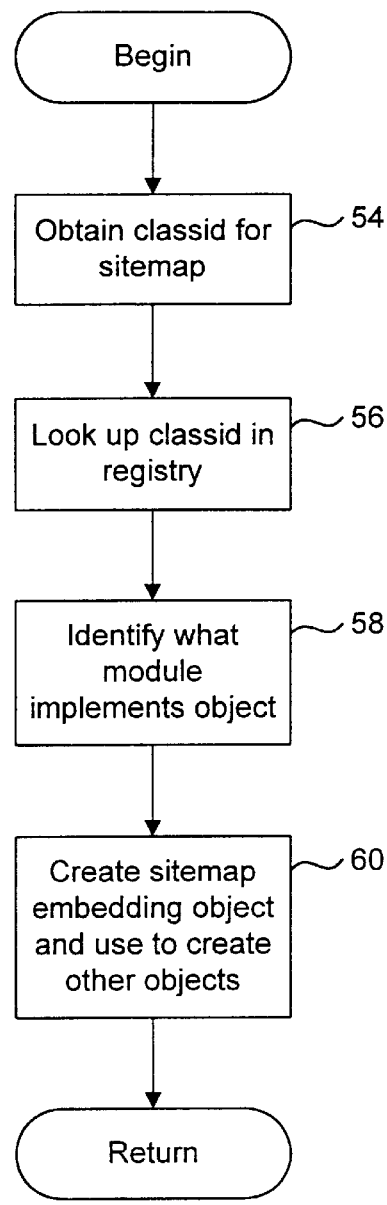
FIG. 5 is a flowchart illustrating the steps that are performed to create objects at the client computer for holding contents of a sitemap file.

The contents of the sitemap file 34 are extracted and stored in objects at the client computer 10. In order to create such objects, the preferred embodiment of the present invention performs the steps shown in FIG. 5. First, the classid for the sitemap is obtained (step 54 in FIG. 5). The classid specifies an object class for a SitemapEmbedding object. The classid is located in the fields delimited by the <object> tags or alternatively is known by default by the explorer 18. An entry for the specified classid is then located in the registry 19 (step 56 in FIG. 5). The registry 19 holds an entry that identifies what module implements the SitemapEmbedding object (step 58 in FIG. 5). The SitemapEmbedding object 62 (FIG. 6) knows how to create a SiteList object 64 that contains a list of all sitemaps. A SiteMap object 66A and 66B is created for each sitemap file, and each of these SiteMap objects is stored in the SiteList object 64 that acts as a container object. The SiteMap objects 66A and 66B contain a set of site objects 68. A site object 68 is provided for each list item (i.e., web page) in the sitemaps.

The SiteList object 64 may be more formally defined as follows:

```
class SiteList {
protected:
    SiteMap* _FindSite(LPTSTR lpszFile);
    SiteMap* _NewSiteMap(LPTSTR lpszFile);
    SiteMap* _NewSingleItemSiteMap(LPTSTR lpszFile);
    SiteMap* _NewSiteMapFromBuf(LPTSTR pszBuf);
    BOOL _AttachSite(SiteMap*);
    LPTSTR GetFileChars(LPTSTR lpszFile);
    BOOL AddSiteMap(SiteMap *pSiteMap, BOOL fSingleItem);
    void CheckAndRemoveOldSitemap();
    HDPA _hdpaSites;
public:
    SiteMap* AddSiteMap(LPTSTR lpszFile);
    SiteMap* AddExplicitLocation(LPCITEMIDLIST pidl);
    SiteMap* AddSiteMap(IStream *pstm);
    BOOL AddSiteMap(SiteMap *pSiteMap, BOOL fSingleItem);
    void Remove(SiteMap*);
    SiteList();
        ~SiteList();
        int GetCount();
        void Remove(int i);
        Site* Enum(int i);
        SiteMap * EnumMaps(int i);
        int IncrementViewCount(Site *pSite);
        int DecrementViewCount(Site *pSite);
    #ifdef DEBUG
        void DebugDump();
    #endif
};
BOOL SL_AddExplicitLocation(LPCITEMIDLIST);
BOOL SL_AddNewSiteMap(LPTSTR lpszFile);
BOOL SL_AddNewSiteMap(IStream *pstm);
Site* PidlToSite(LPCITEMIDLIST pidl, Site* psite);
```

As can be seen above, the SiteList object 64 supports a number of functions. For example, the SiteList object 64 supports a function for locating sites within the SiteList (i.e., FindSite()), finctions for creating new sitemap objects 66A, 66B (i.e., NewSiteMap() and NewSingleItemSiteMap()) and functions for adding sitemap objects to the SiteList (i.e., AddSiteMap()). Functions are also provided for removing a sitemap from the SiteList (i.e., Remove()) and returning a pointer to a list of sites within the SiteList.

The sitemap objects 66A and 66B have the following format:

```
class SiteMap {
protected:
    int _cRef;
    BOOL _fSingleItem;
    BOOL _fRegistered; // true if fully built and attached
        to the namespace
    Site* pSiteFirst;
    LPTSTR _pszMapFile; // location of the sitemap file
    int _cViewCount; // How many views have saved pointers
        to this sitemap
    DWORD _dwTimeStamp; // Indicator of the least recently
        viewed site.
public:
    SiteMap(BOOL);
    ~SiteMap();
    int AddRef();
    int Release();
    BOOL Load(LPTSTR lpsz, LPTSTR lpszFrom);
    BOOL LoadFromBuf(LPTSTR pszBuf);
    void Register();
    BOOL IsFrom(LPTSTR lpszFrom);
    Site* GetSite() { return pSiteFirst; };
    BOOL fSingleItem() { return _fSingleItem;};
    int IncrementViewCount() {_dwTimeStamp =
        GetTickCount(); return
    ++_cViewCount;};
    int DecrementViewCount() { return -_cViewCount;};
    int GetViewCount() { return _cViewCount; };
    DWORD GetTimeStamp() { return _dwTimeStamp; };
};
```

The noteworthy fields within the sitemap objects include the pSiteFirst field. The sitemap files are downloaded asynchronously. As such, the home page of a web site may be downloaded before the sitemap file. In such a case, the home page is added to shell namespace, and fSingleItem serves as a marker to the home page. Subsequently, if the sitemap file is downloaded, the marker to the home page is renamed and moved to the appropriate location.

The cViewCount field holds a value that specifies how many views have saved pointers to the sitemap and acts as a reference count. The Boolean variable fsingleItem provides a value that indicates whether the sitemap is a sitemap that holds only a single site. The pszMapFile field holds a pointer to the location of the sitemap file from which the SiteMap object was created.

Each SiteMap object also includes a number of finctions that it supports. These functions allow a sitemap to be loaded into the sitemap object (i.e., Load() and LoadfromBuf()) and facilitate the retrieval of a site within the sitemap object (i.e., GetSite()). A function is provided for removing a SiteMap object (i.e., Release()).

The site objects 68 have the following format:

```
class Site {
protected:
    LPTSTR _ReadInnerData(LPTSTR *ppsz);
    void _EatSpace(LPTSTR *ppsz);
    DWORD _ReadTag(LPTSTR *ppsz, BOOL
        fIgnoreContent = FALSE);
    int _PeekTag(LPTSTR* ppsz);
    BOOL_LoadNodeData(LPTSTR *ppsz);
    BOOL _LoadChildren(LPTSTR* ppsz);
    BOOL _ReadToTag(LPTSTR *ppsz, DWORD dwSearchTag);
    void _AddChildSite(Site* pChild);
    int _GetStdIconIndex(LPTSTR pszFile, int i);
    Site *_GetTopmostSite();
    DWORD _GetParamName(LPTSTR *ppsz);
    BOOL _ProcessClassIdInfo(LPTSTR *ppsz);
    BOOL _ProcessParamInfo(LPTSTR *ppsz);
    DWORD _GetNextTag(LPTSTR *ppsz);
    BOOL _ProcessObjectTag(LPTSTR *ppsz);
    friend class SiteList;
    /// data
    LPTSTR _pszName;
    LPTSTR _pszURL;
    LPTSTR pszIcon;
    HDPA _hdpaChildren;
    LPITEMIDLIST _pidlFull;
    int _cRef;
    Site * _psiteParent;
    BYTE _bType;
    BOOL _fIsEqual(LPTSTR pszUrl) { return !lstrcmp
        (_pszURL, pszUrl); };
public:
    BOOL Load(LPTSTR *ppsz);
    LPITEMDLIST FullPidl();
    int AddRef();
    int Release();
    BOOL SetName(LPTSTR lpsz);
    BOOL SetUrl(LPTSTR lpsz, BYTE bType);
    LPITEMIDLIST CloneID();
    int SysIconIndex();
    ~ Site();
    Site(Site* psiteParent);
    Site* Enum(int i);
    LPTSTR GetUrl() {return _pszURL;};
```

```
    LPTSTR GetName() {return _pszName ?
    _pszName : GetUrl();};
    int GetCount();
    Site* GetParent() { return _psiteParent;} ;
    Site* FindSite(LPTSTR pszUrl, BOOL fRecurse);
    BOOL IsInternetRoot() { return !((BOOL)this),};
    int IncrementViewCount();
    int DecrementViewCount();
};
```

The noteworthy fields provided within the site object include the pszName field which holds a pointer to the name of the site and the pszURL field which holds the value of the URL. The pszIcon field holds a name of the icon that is to be used to represent the site. The hdpaChildren field is an array of pointers to child sites. The pidlFull field is a pidl structure that holds a pointer to an item id list. The psiteParent field holds a pointer to the parent site of the current site.

Functions are provided in the site objects 68 for setting the name held in the pszName field (i.e., SetNames()) and setting the URL held in the pszURL field (i.e., SetUrl()). Functions are also provided for retrieving information from the fields of the site object (i.e., GetUrl(), GetName(), GetCount() and GetParent()). Functions for incrementing or decrementing the view reference count are also provided (i.e., IncrementViewCount() and DecrementViewCount()). The view reference counts are maintained to prevent the shell namespace from getting unwieldy. One can envision the shell namespace getting unduly large if each sitemap was blindly added to the shell namespace. A view reference count is maintained for each entire sitemap. When the view reference count goes to zero, the sitemap is removed.

As was mentioned above, a SitemapEmbedding object 62 knows how to create the SiteList object 64. The SitemapEmbedding object 62 is asked to load by the operating system 23. The load function is part of a dynamic link library designated as SHDOCVW.DLL. This dynamic link library gains control and loads the sitemap file on behalf of the SitemapEmbedding object, which creates the SiteList object and the sitemap and site objects contained therein (step 60 in FIG. 5).

Figure 7:
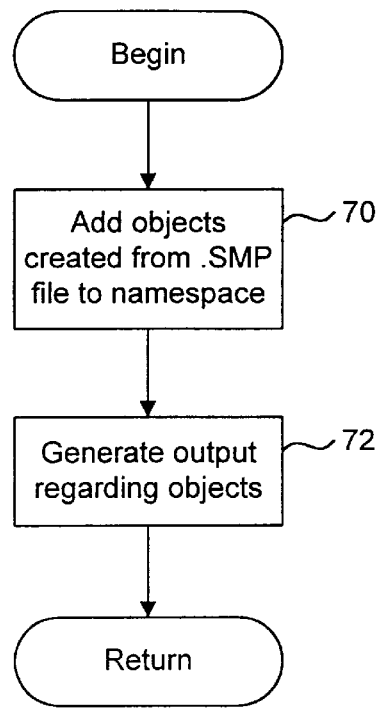
FIG. 7 is a flowchart illustrating the steps that are performed to use the contents of the sitemap file at the client computer.

Once the sitemap file 34 is downloaded, it must be processed. The processing that occurs depends upon the nature of the contents of the sitemap file 34. Where the sitemap file 34 holds a hierarchical index of web pages at a web site or holds search results, the steps depicted in FIG. 7 are performed. In these instances, the objects that are created in response to the downloading of the sitemap file are added to the shell namespace (step 70 in FIG. 7). The shell of the operating system 23 provides a namespace that is visible via the explorer 18. The Microsoft® Windows® 95 Operating System facilitates adding objects for the web pages listed within the sitemap file to the shell namespace or adding objects for search results into the shell namespace so that the objects are visible by the explorer. In particular, a namespace notification is a notification that indicates that new items have appeared and are to be added to the shell namespace. Views of the object are then displayed and/or audio output regarding the objects may be generated (step 72 in FIG. 7).

Figure 6:
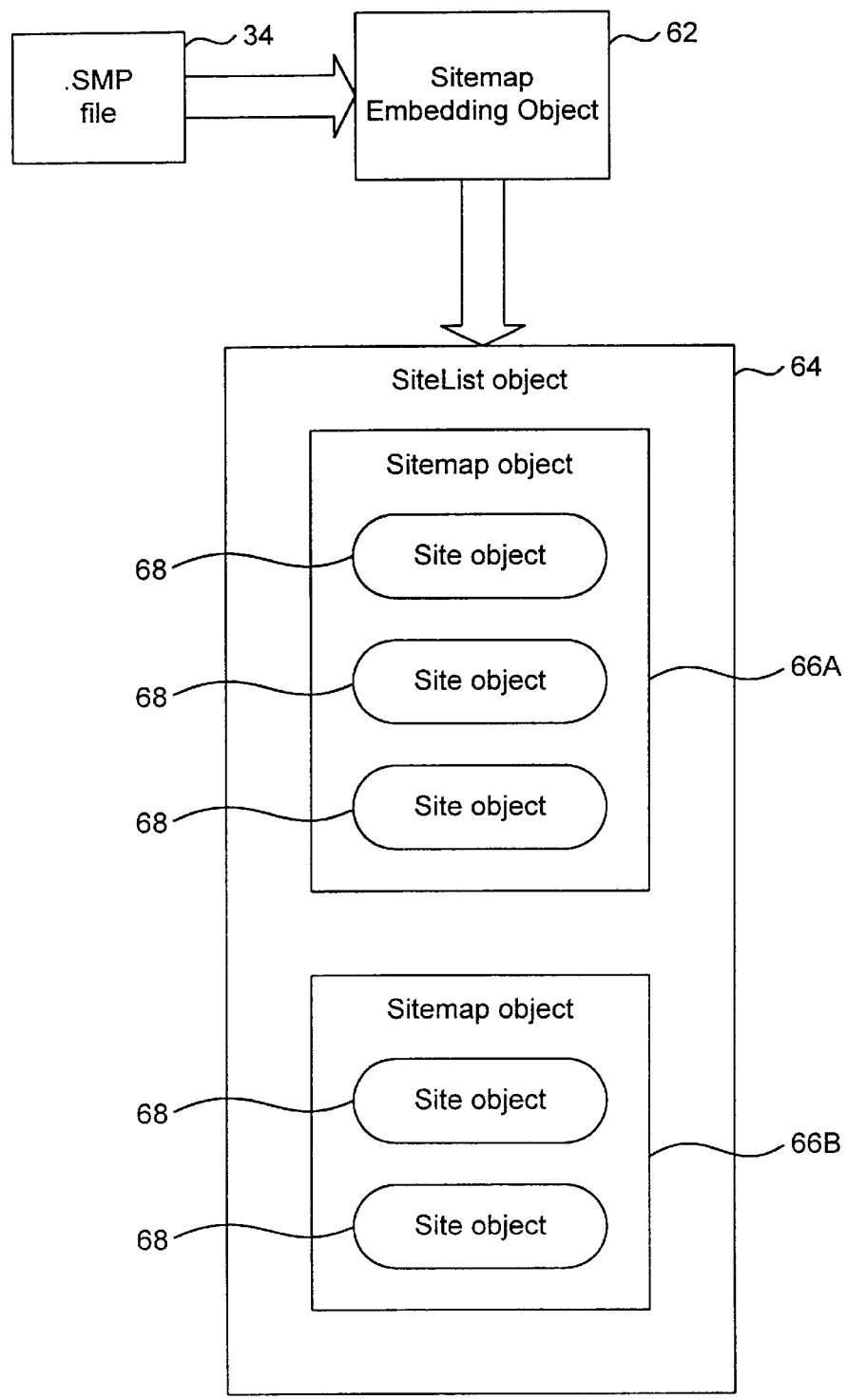
FIG. 6 is a block diagram illustrating an example of the creation of objects for holding contents of the sitemap file at the client computer.

The objects depicted in FIG. 6 are added to the namespace as shell folder objects that support the IShellFolder object interface, that is defined by the operating system 23. Each of the site objects 68 specifies a view object in the form of an icon may be used to represent the site in video output.

Figure 8:
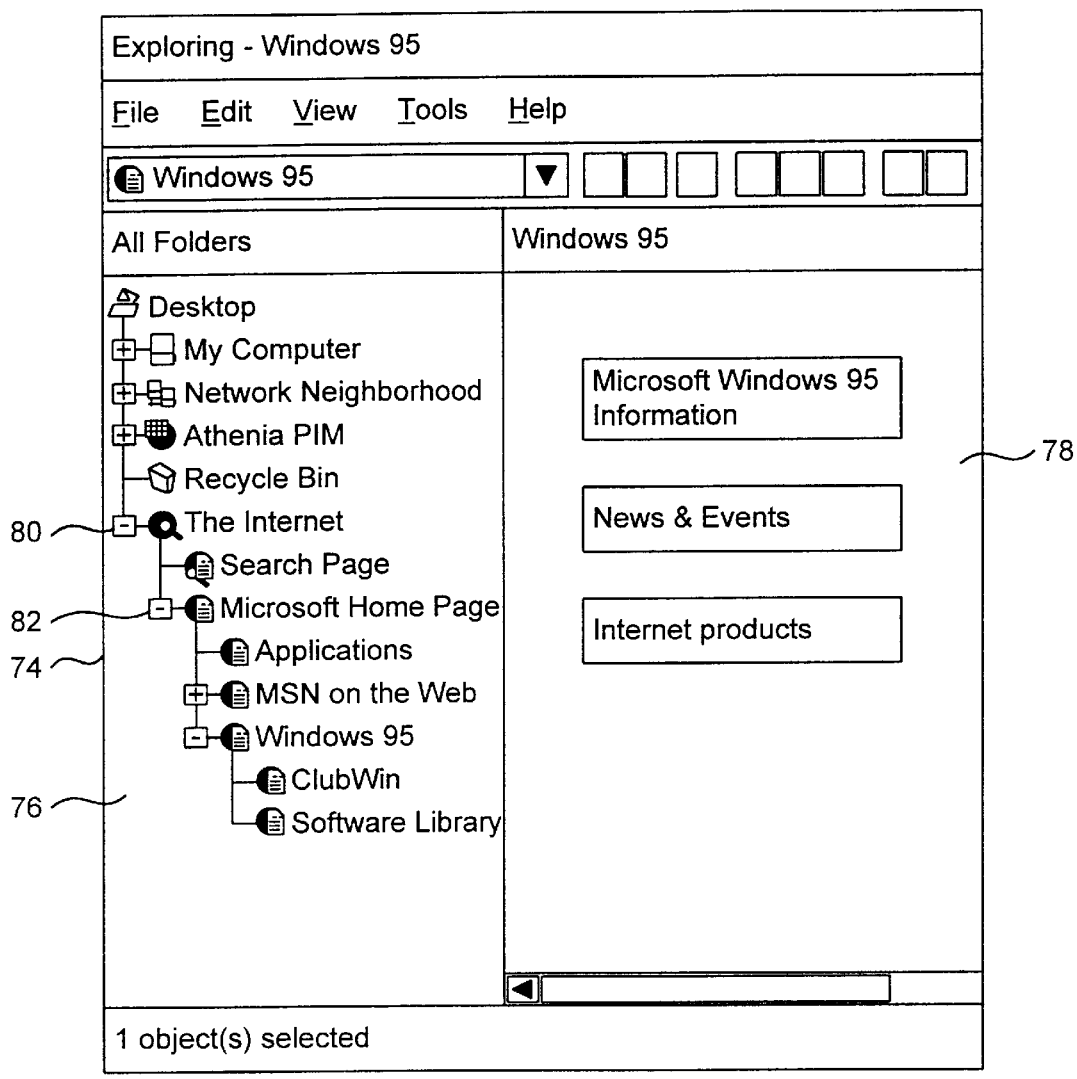
FIG. 8 depicts an example window for the explorer in the preferred embodiment of the present invention.

FIG. 8 shows an example of the displaying of the web pages at web sites. Specifically, FIG. 8 depicts an explorer window 74 that is associated with explorer 18. The left pane 76 of the explorer window 74 depicts the shell namespace in hierarchical fashion. In particular, the shell namespace is depicted as a hierarchical tree that is implemented using a tree view control. The root node of the web pages is defined to always be the "Internet". Hence, the view of the shell namespace shown in the left pane 76 has an entry 80 for the Internet. An entry 82 is also provided for a Microsoft home page. The right pane 78 holds the contents of the currently opened item from the left pane.

Figure 9:
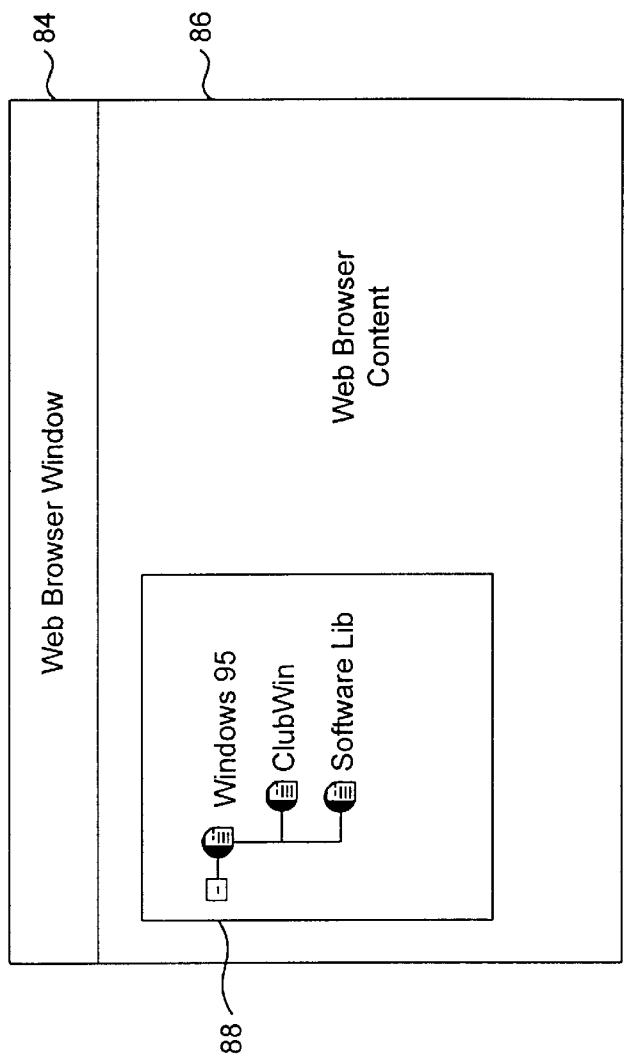
FIG. 9 depicts an example of the use of a pop-up window to hold the contents extracted from a sitemap file.

FIG. 9 depicts an alternative wherein the sitemaps are depicted within a pop-up window 88 that is displayed atop a web browser content 86 for web browser 84. In this alternative, the web browser has a separate window in which web pages may be displayed as web browser content 86. The hierarchical tree constructed from the sitemap files is displayed in a pop-up window 88.

Figure 10:
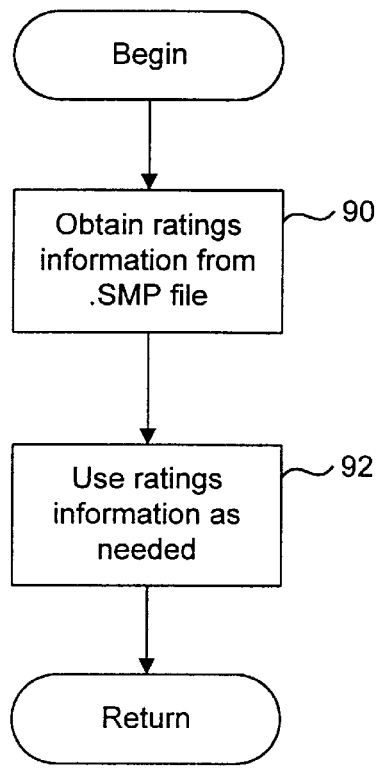
FIG. 10 is a flowchart illustrating the steps that are performed to use ratings information held in a sitemap file.

As has been mentioned above, a sitemap file may hold ratings information in addition to, or in the alternative, of the hierarchical call index or query results information. A ratings field may be provided for each web page. In such an instance, the sitemap file is located and retrieved as discussed above but the processing of the sitemap file contents (see step 42 of FIG. 3) differs. FIG. 10 depicts the steps that are performed in such an instance. Initially, the ratings information is extracted from the sitemap file 34 (step 90 in FIG. 10). The ratings information is then used as needed (step 92 in FIG. 10). For example, the ratings information may be depicted in the index that is shown in the pop-up window 88 or the left pane 76 of the explorer window 74. Moreover, the ratings information may be compared with the user profile to determine whether a user should be permitted access to web pages. For example, certain web pages may contain sexual or violent content that is inappropriate for young users. The ratings information may be utilized by an application in the web browser to prevent the young users from accessing those pages. Furthermore, the ratings information may provide clues to adult users on whether or not they wish to access certain web pages.

Figure 11:
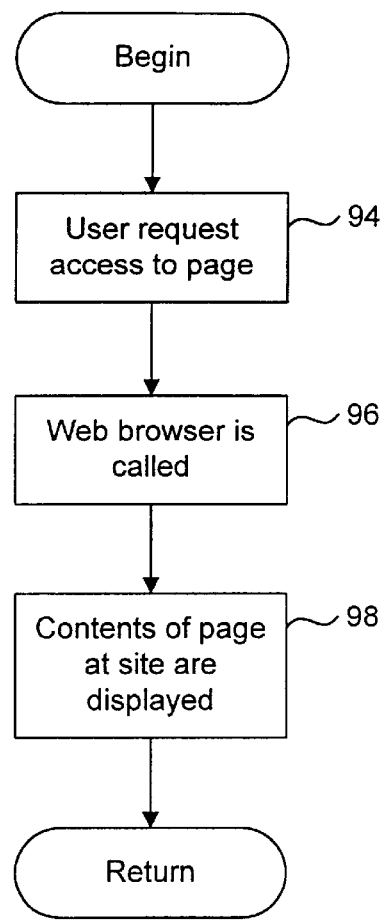
FIG. 11 is a flowchart illustrating the steps that are performed when a user requests access to a web page that has a visual element displayed within a window.

Once the web pages are shown in the left pane 76 of the explorer window 74 or in the pop-up window 88, the web pages are treated like other folders or documents. In particular, if a user requests access to one of the pages by selecting the icon for the page (step 94 in FIG. 1), the application associated with the web page document is called. In this case, the web browser of explorer 18 is called (step 96 in FIG. 11), and the web browser retrieves the contents of the page using the URL stored in the site object 68 for the web page. The contents of the page at a specified site are displayed (step 98 in FIG. 11).

Figure 12:
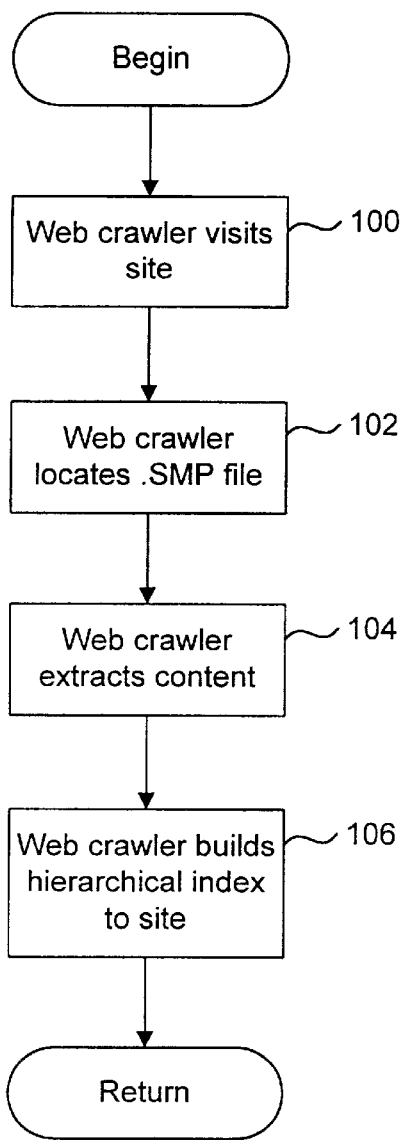
FIG. 12 is a flowchart illustrating the steps that are performed by a web crawler to utilize sitemap files.

The sitemap files need not be used solely by web browsers but may also be used by web crawler programs. FIG. 12 is a flowchart illustrating the steps that are performed for a web crawler to use the sitemap files. In particular, the swift crawler visits the site that has a sitemap file (step 100 in FIG. 12). The web crawler then locates the sitemap file (step 102 in FIG. 12) at the default location or at the location specified within the fields of the object tag. The web crawler extracts the contents from the sitemap file (step 104) and uses the information to build a hierarchical index to the site (step 106 in FIG. 12).

Figure 13:
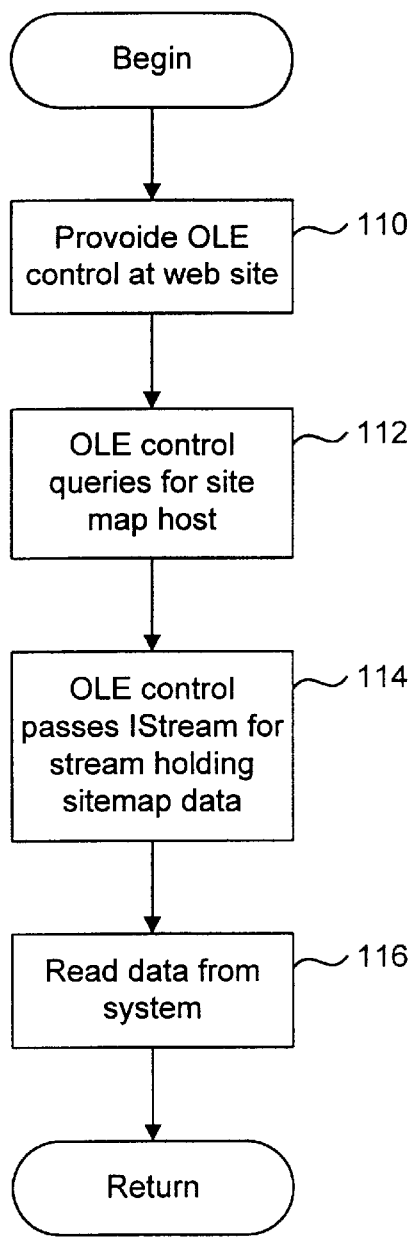
FIG. 13 is a flowchart illustrating the steps that are performed when an OLE control at a web site obtains and passes sitemap data to the client computer.

The above discussion has focused on an embodiment where a passive sitemap file is located at a web site. In an alternative embodiment of the present invention, there are active sitemap OLE controls. FIG. 13 is a flowchart illustrating the operation of such OLE controls. In this alternative embodiment, an active sitemap OLE control is provided at the web site (step 110 in FIG. 13). The OLE control is then prompted to query for a sitemap host (step 112 in FIG. 13). Once it has identified a sitemap host, it passes to the host an identifier for an instance of the IStream interface (as defined by the Microsoft OLE 2.11 protocol) for a stream that holds sitemap data (step 114 in FIG. 13). The methods in the instance of the interface are then utilized to read data from the stream so that it may be downloaded to the client computer (step 116 in FIG. 13).

While the present invention has been described with reference to a preferred embodiment thereof, those skilled in the art will appreciate that various changes in form and detail may be made without departing from the intended scope of the present invention as defined in the appended claims. For example, the information in the sitemap need not be stored in a separate file but rather may be stored in-line.

What is claimed is:

1. In a distributed environment having a server computer holding web pages, including a selected web page, and a client computer that seeks access to at least one of the web pages, a method comprising the steps of:

providing a sitemap at the server computer that holds information regarding contents of at least some of the web pages, wherein the sitemap is distinct from web pages;

with the client computer, attempting to locate the sitemap at a default location;

if the sitemap is not located,
examining the selected web page for information regarding a location of the sitemap;
using the information in the home web page related to the selected web page to locate the sitemap;

downloading the sitemap from the server computer to client computer; and
using the information in the sitemap at the client computer.

2. The method of claim 1 wherein the server has an associated uniform resource locator and the default location is specified by appending a predefined string to the uniform resource locator of the server computer.

3. The method of claim 1 wherein the selected web page employs a predefined tag to indicate where the information regarding the location of the sitemap file is within the server computer.

4. The method of claim 1 wherein the sitemap is provided in its own file.

5. In a distributed system having a server holding web pages, including a home web page, and a sitemap file at the server that holds information regarding contents of at least some of the web pages and a client that seeks access to at least one of the web pages, a computer-readable storage medium holding instructions for:

attempting to locate the sitemap file at a default location;
if the sitemap file is not located,
examining the home web page for information regarding a location of the sitemap file;
using the information in the home web page to locate the sitemap file; and
downloading the sitemap file from the server to the client, wherein the sitemap file is distinct from the web pages.

* * * * *

UNITED STATES PATENT AND TRADEMARK OFFICE
CERTIFICATE OF CORRECTION

PATENT NO. : 6,175,863 B1
DATED : January 16, 2001
INVENTOR(S) : J.D. Belfiore et al.

It is certified that error appears in the above-identified patent and that said Letters Patent is hereby corrected as shown below:

Title page,
Item [56], References Cited, U.S. PATENT DOCUMENTS,
"Clince et al." should read -- Cline et al. --

OTHER PUBLICATIONS,
Please insert in appropriate order the following:
-- Josh Paluch, "WebMapper 2.0 Makes Site Management Easier," CNET Reviews, Jan. 20, 1997. --

Column 1,
Lines 27-28, "nar-nespace", should read read and break -- name-space --

Column 2,
Line 1, "window. in" should read -- window. In --

Column 3,
Line 12, "riot" should read -- not --

Column 5,
Line 9, "classed" should read -- classid --

Column 6,
Line 17, after "each" delete "40"

Column 7,
Line 34, "finctions" should read -- functions --
Line 67, "return-__ cViewCount;};" should read -- return --__cViewCount;}; --

UNITED STATES PATENT AND TRADEMARK OFFICE
CERTIFICATE OF CORRECTION

PATENT NO. : 6,175,863 B1
DATED : January 16, 2001
INVENTOR(S) : J.D. Belfiore et al.

It is certified that error appears in the above-identified patent and that said Letters Patent is hereby corrected as shown below:

Column 8,
Line 2, "return-__ cViewCount;}" should read -- return --__cViewCount;} --
Line 8 of second table, "BOOL LoadNodeData" should read
-- BOOL__LoadNodeData --

Column 9,
Line 51, "95" should read -- 95 --

Signed and Sealed this

Eighteenth Day of December, 2001

JAMES E. ROGAN
*Director of the United States Patent and Trademark Office*

*Attest:*

*Attesting Officer*